INVENTORS
JOHN J. VAN VOORHIS,
HENRY S. PESA &
CAROL A. STOWE VAN VOORHIS

THEIR ATTORNEYS

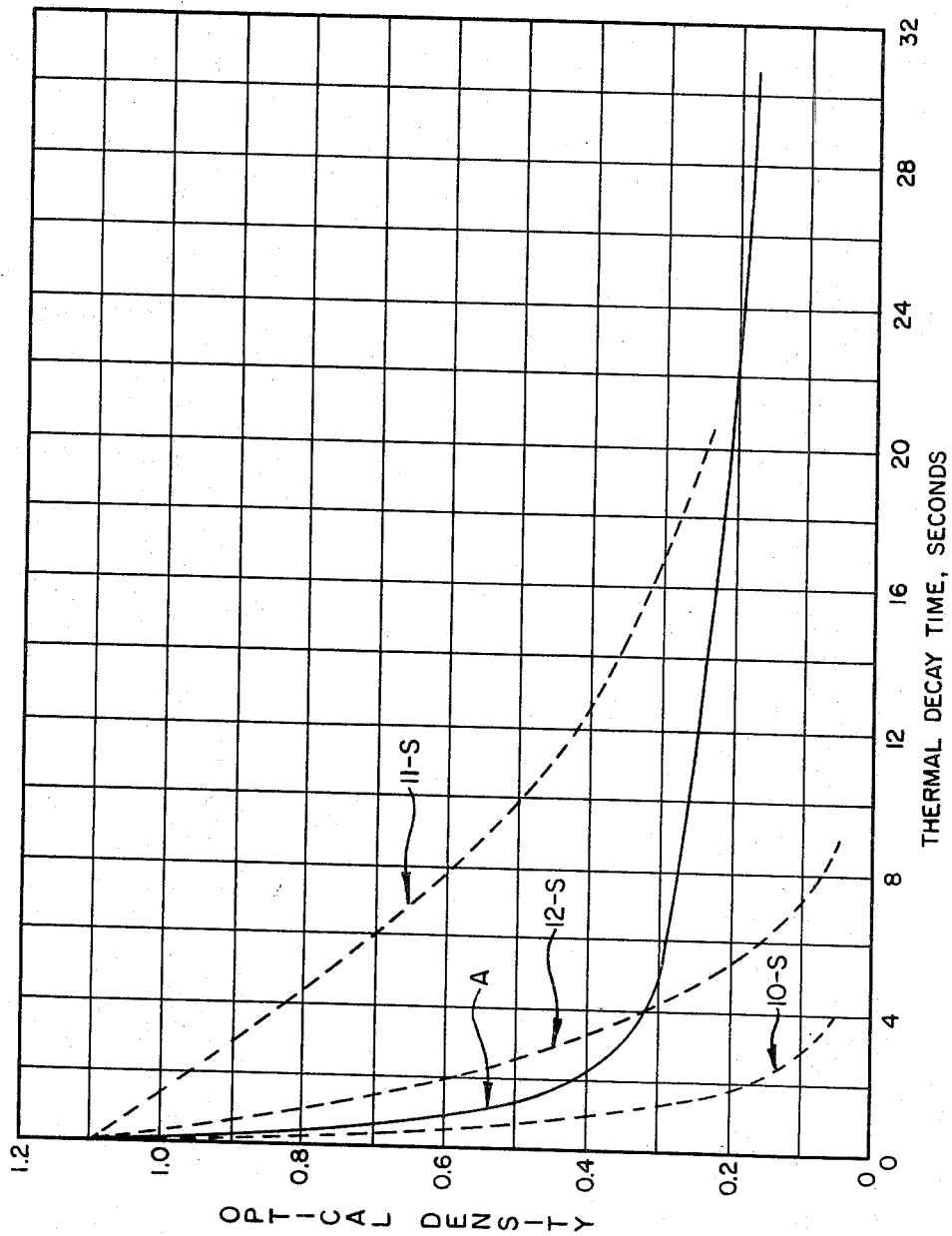

United States Patent Office 3,528,926
Patented Sept. 15, 1970

3,528,926
MIXED PHOTOCHROMIC COMPOUND COMPOSITION
John J. Van Voorhis, Henry S. Pesa, and Carol A. Stowe Van Voorhis, Dayton, Ohio, assignors to The National Cash Register Company, Dayton, Ohio, a corporation of Maryland
Filed Oct. 27, 1966, Ser. No. 589,996
Int. Cl. G02b 5/24; G02f 1/36
U.S. Cl. 252—300
7 Claims

ABSTRACT OF THE DISCLOSURE

This disclosure is directed to selected color reversible, liquid, solution mixtures containing thermoplastic polymers and certain selected substituted photochromic indolino benzospiropyran compounds which have an improved combination of properties, including thermal fade rate, sensitivity to ultraviolet light, fatigue resistance and absorption bandwidth, which combination enables these liquid solution mixtures to provide effective protection against high energy radiation, e.g., by protecting the eye against flash brightness and retinal burn.

---

The use of photochromic compounds for protecting the eye against flash blindness and retinal burn has heretofore been disclosed in U.S. Pat. No. 3,152,215, which issued to Frederick E. Barstow et al. on Oct. 6, 1964. This patent, inter alia, discloses apparatus and light detection and triggering system which provides ultraviolet light of sufficient energy to activate the photochromic materials. The photochromic materials of this patent are disposed on one or more faces of lens elements which are interposed between the objects to be protected and the source of high energy radiation. These prior art lens elements consist of a transparent support coated with an essentially dry, thin polymeric film which comprises the light sensitive photochromic dyes dispersed in solid solution therein.

The class of indolino benzospiropyran compounds useful in the protective filter applications of the present invention are relatively well known in the art. Examples of such compounds are disclosed in U.S. Pat. No. 3,100,778, issued to Elliot Berman on Aug. 13, 1963, and in U.S. Pat. No. 3,231,584, issued to Elliot Berman et al. on Jan. 25, 1966. Photochromic compounds have the property of undergoing a reversible photo-induced change in color and concomitant change in light absorption when exposed to light in the blue or ultraviolet region of the light spectrum. In general terms, a solution of most photochromic compounds will exist as a relatively colorless, non-light absorbing solution under ambient room temperature conditions, but when exposed to ultraviolet light, the same solution will become strongly colored and absorbent of certain wave lengths of the visible spectrum. When the source of activating ultraviolet light is removed, the color gradually fades from an optically dense state until the solution exists in its original essentially colorless non-absorbing stable state. The rate at which color fades from such photochromic solution systems is dependent, principally, on such variables as the structure of the photochromic compound, the solution temperature, the composition of the solvent vehicle, and the like. On the other hand, the degree of coloration or optical density is also a function of several parameters. Some of the important parameters to be considered in the design of any functional device are the source of light energy, duration of exposure to such energy, sensitivity of the photochromic compounds to specific wavelengths of activating light, etc. For purposes of the invention, the rate at which the photochromic compounds revert from the colored state to the essentially colorless state, that is, the fade rate, is normally expressed as the half-life of the compound, or as the half-density, $D/2$ of the mixture of dye compounds. If a mixture of photochromic compounds is involved, the rate is a measure of the composite half-life of the compound mixture at a given temperature and under given surroundings. It has been found that the rate of reversion of such compounds is temperature dependent, the rate increasing with increasing temperature. Thus, the thermal half-life of such compounds is a quantitative measure of the thermal stability of the compounds or mixture of compounds in a given environment. Methods for determining the half-life of such compounds are known in the art and will not be repeated herein. Indolino benzospiropyrans with a half-life ranging from several months to a fraction of a second are known in the art. Some, for example, are disclosed in U.S. Pats. No. 3,100,778 and 3,231,584 previously cited above. However, the spiropyran dyes of the invention have thermal half-lives, at about room temperatures, which fall within the category of short half-life compounds, in keeping with the rapid fade requirement placed on eye protective filter devices. A desirable feature of such devices is a reversible light filter which is readily changed from a high open-transmission state to a high optical density state, and which will rapidly revert, by means of ambient thermal activity, from a closed high optical density state to a high open transmission state.

Although the photochromic compositions of the present invention are especially useful in protecting the human eye from retinal burns and flash blindness produced by nuclear explosions, their utility also extends to the protection from unwanted exposure to light of devices, machines, or circuits which may comprise light-sensitive circuits, diodes, electro-optical devices such as vidicon tube devices, etc. In providing such protection, the compositions of the invention are generally incorporated into a lens element, the combination of which provides the following highly desirable filter properties to a maximum degree:

(1) large change in optical density
(2) rapid self-clearing of the filter (short thermal half-life)
(3) long recycle life (fatigue is minimal)
(4) filter closure time is in microsecond range
(5) the open filter has a high luminous transmittance The use of different compositions comprising photochromic compounds for light filtering applications is known in the art of photochromic filters and at this point in time, such use has evolved through a number of related but distinct generations of lens structures and associated active materials. A typical application of photochromic compositions for light filtering is disclosed in the previously mentioned U.S. Pat. No. 3,152,215, issued to Barstow et al. As disclosed therein, the photochromic materials are utilized as an essentially dry coating of polymeric film with the photochromic compounds dispersed or dissolved therein. Such prior art coatings were inefficient in many respects and were subject to series disadvantages, particularly with regards to reduced sensitivity, increased half-life, and poor fatigue characteristics. The present invention, on the other hand, obviates the above-mentioned and other prior art disadvantages by providing a mixed photochromic dye solution filter wherein, among other improvements, the sensitivity to ultraviolet light, resistance to fatigue, and the thermal fade rate are greatly improved. A major improvement occasioned by the use of two or more photochromic dyes in solution is the provision of a filter of predetermined thermal half-life without loss of any one or more of other important filter characteristics such as high U.V. sensitivity, high closed density, high open transmission, etc.

Although hundreds of photochromic spiropyrans have been tested for filter applications, none have been found to possess the same set of characteristics, and certainly, none have been found possessing ideal characteristics for eye-protective filters. One very important feature of such filters is the thermal half-life which, ideally, is around five seconds; another is high absorbence in the visible region; yet another is broad absorption bandwith, etc. No single spiropyran compound tested so far comprehends the ideal or near ideal combination of these eye filter characteristics. For example, a compound with a high absorbence in the visible spectrum may have an undesirably low thermal half-life or low sensitivity to activating light; whereas, another compound with an ideal thermal half-life has low absorbence in the visible region of the spectrum. Another important feature of a photochromic filter is the absorption bandwidth. The ideal filter would be a reversible neutral density filter; that is, a filter in which the different wavelengths of light in the visible spectrum are absorbed to the same degree and with equal facility. However, since reversible neutral density filters are not available, the filter having the broadest absorption bandwidth, other characteristics being equal, will provide the most desirable filter. In practice, a neutral density filter is obtained with side band filters which absorb at each end of the visible spectrum. The mixed dye solution compositions of the invention provide an absorption bandwidth which is broader than the bandwidth obtained with any single compound of the composition. Generally, the bandwidth of the mixed solution composition is broader, the further apart are the absorption maxima of the individual photochromic compounds of the solution. It has been found that all mixed dye solution filters broaden the absorption bandwidth; but, contrariwise, the same phenomenon has not practically been obtained, for reasons not fully understood, with a polymeric coating containing mixed dyes. A contributing factor to the different results obtained with coatings and solutions is believed to be due to the fact that deviation from Beer's law are more serious in coatings than in solutions. For that reason, additivity in properties can be practically obtained with mixed dye solutions but not with mixed dye polymer films.

Accordingly, it is an object of this invention to provide a thermally reversible mixed photochromic dye solution composition.

Another object of the invention is the provision of a benzospiropyran containing composition of predetermined half-life without the loss or deterioration of other important eye filter characteristics.

Yet another object of the invention is the provision of a mixed photochromic dye filter composition having improved sensitivity to ultraviolet light, improved resistance to fatigue, and improved thermal fade rate and absorption bandwidth.

The mixed photochromic dye filter compositions of the present invention comprise at least two photochromic indolino benzospiropyran compounds and at least one polymeric material dissolved in a mutual solvent therefor.

Typical photochromic compounds useful in the invention have the following basic structure:

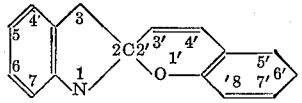

and substituents identified as to type and location on the said structure as shown in Table I below:

TABLE I

| Compound No.: | Substituents |
| --- | --- |
| 10 | 1-phenyl; 3,3-dimethyl; 5'-bromo; 6'-nitro; 8'-methoxy |
| 11 | 1-methyl; 3-phenyl; 3-n-propyl; 6'-nitro |
| 12 | 1-phenyl; 3,3-dimethyl; 6'-nitro; 8'-methoxy |
| 13 | 1-isoamyl; 3,3-dimethyl; 5',5',6'-trinitro; 8'-methoxy |
| 14 | 7-phenyl; 1,3,3-trimethyl; 5'-bromo; 6'-nitro; 8'-methoxy |
| 15 | 1,3,3-trimethyl; 6'-nitro |
| 16 | 1-methyl; 3-phenyl; 3-n-propyl; 5',7'-dimethoxy; 6'-nitro |
| 17 | 1,3,3-trimethyl; 5',7'-dimethoxy; 6'-nitro |
| 18 | 1,3-dimethyl; 3-phenyl; 6'-nitro |
| 19 | 1,3,3-trimethyl; 5',5',6'-trinitro; 8'-methoxy |

The above and similar compounds, as well as methods for making such compounds, are either disclosed directly, or are obvious in view of such prior art shown in, for example, U.S. Pats. No. 3,100,778; 3,231,584; 3,085,469; and Wizinger et al., Helvetica Chemica Acta, vol. 23, pp. 247–271 (1940).

Two or more of any of the compounds of Table I may be mixed with the conjoined polymeric and other materials to provide the novel filters of the invention. However, it has been found that certain dye combinations, for example, as in Table II, below, provide filter compositions having one or more of the above mentioned preferred eye filter characteristics and advantages.

TABLE II

| Filter | Photochromic compounds | Half-density D/2 at 25° C. in seconds |
| --- | --- | --- |
| A | 10, 11, 12 | 5 |
| B | 11, 12 | 4 |
| C | 11, 13 | 35 |
| D | 13, 14, 15 | 45 |
| E | 10, 12, 16 | 2 |
| F | 10, 12, 17 | 2 |
| G | 18, 19 | 16 |

Many polymers are suitable as the polymeric ingredient of the novel compositions. The preferred polymeric materials are thermoplastic and are readily soluble in the more common hydrophilic and/or hydrophobic solvents. Typical of polymers useful herein are: polymethyl methacrylate, polystyrene, polyvinyl chloride, ethyl cellulose, cellulose acetate butyrate, polyvinyl pyrolidone, polyvinyl acetate, carboxy-methyl hydroxyethyl cellulose, alphamethyl styrenevinyl toluene copolymer, styrene methyl methacrylate copolymer, polyvinyl formal, and the like.

The amount of polymeric material may range from 1% to 20% by weight of the composition, but preferably varies from 8% to 12% of the composition weight.

As heretofore mentioned, solvents which are suitable in the present invention may be either hydrophilic or hydrophobic. The solvent vehicle may consist of a single solvent or of a mixture of selected solvents. Although there is no criticality in the solvent vehicle or solvents, as such, it is, of course, necessary that the selected vehicle have sufficient solvent power to completely dissolve the polymer and photochromic compounds included in a given solution filter composition. Examples of typical solvents are toluene, carbon tetrachloride, methyl salicylate, benzene, ethanol, butyl acetate, Cellosolve acetate, mesitylene, methyl ethyl ketone, acetone, trichloroethylene, choroform, chlorobenzene, tetrahydrofuran, cyclohexanone, etc. Also very desirable are mixed solvents, exemplary of which there may be mentioned—acetone, methyl ethyl ketone; ethyl formate, ethyl acetate; benzene, ethanol; butanol, mesitylene; benzene, o-diphenyl benzene; ethyl formate, ethyl acetate; ethanol, toluene, ethyl acetate; benzene, trichloroethylene; acetone, ethanol; butyl acetate, ethanol; and the like.

Although not so limited, the maximum photochromic dye concentration does not usually exceed 4%; preferably, the concentration varies from 0.2% to 4% by weight. Unless otherwise indicated, all filter composition percentages set forth herein are by weight of the total filter composition.

It has been determined that the colored form of the individual dyes is generally more polar than the colorless form; so that, in some solvents or solvent mixtures, high dye concentration may cause the colored form of the photochromic dye to precipitate or crystallize out of solution.

Accordingly, the solvent vehicle and dye concentration are selected so that the total quantity of dye is below the saturation threshold (maximum solubility) of the dyes in that particular solvent vehicle. The selection may be readily made by one skilled in the art; it depends mainly upon the intended application and the availability and/or desirability of materials.

The novel features of the invention, together with further objects and advantages thereof, will be more clearly understood from the following descriptions and accompanying drawings and wherein:

FIG. 2 is a plot of thermal decay curves, at 25° C., of filter A and of comparable single dye filters, each comprising a different dye of filter A.

Figure 1:
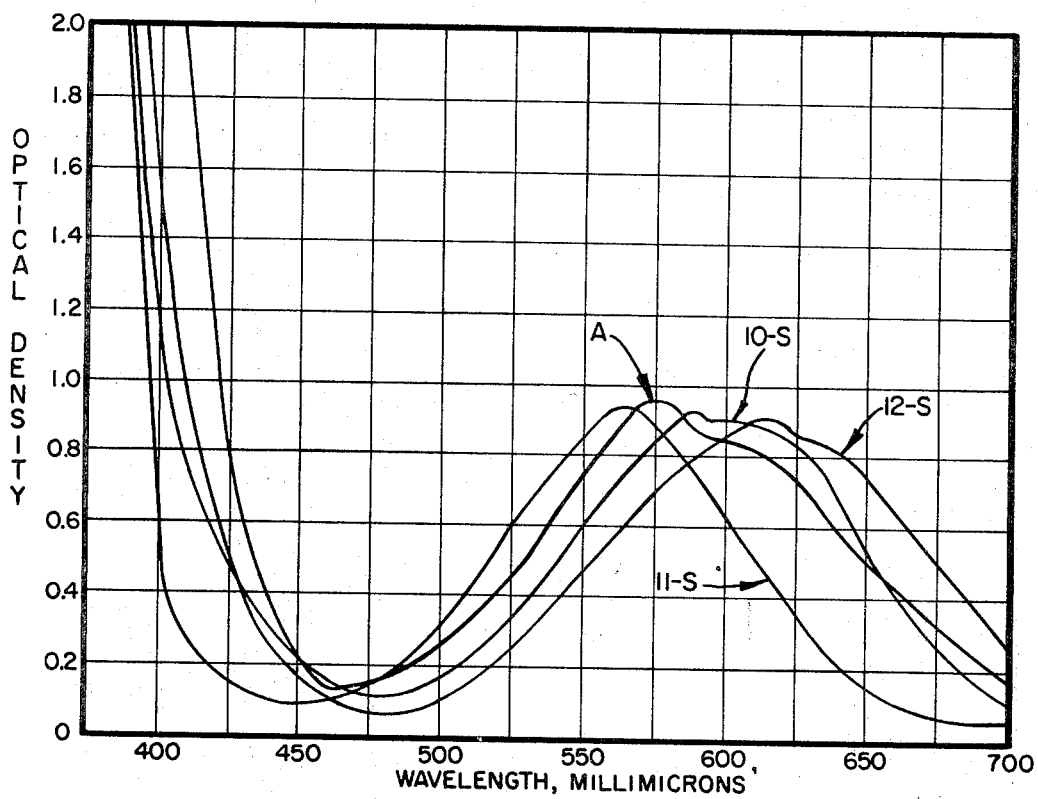
FIG. 1 shows a plot of the optical density versus wavelength of a preferred filter embodiment, filter A, and of comparable single dye filters, each of which comprises a different one of the dyes of mixed photochromic dye filter A.
Figure 3:
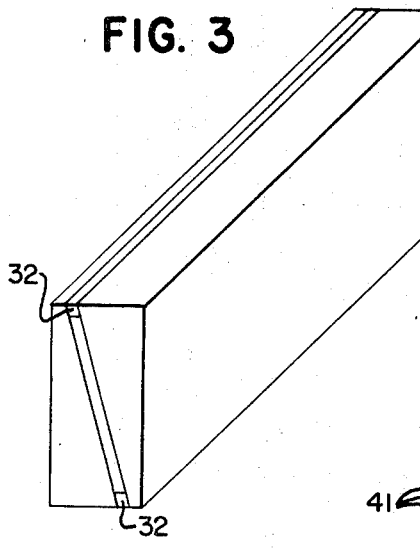
FIG. 3 is an isometric view of a single wedge lens element showing the relation of the mixed dye solution cell to the optical wedge.
Figure 4:
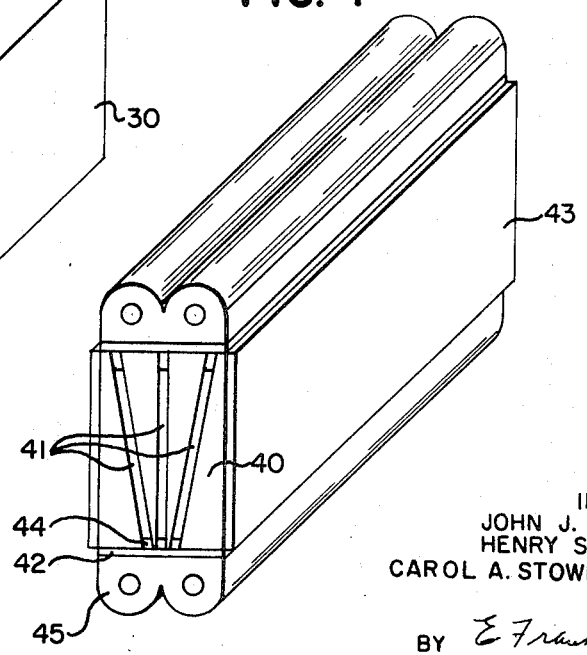
FIG. 4 depicts a double wedge lens assembly and the relation of the components thereof.

Referring now to FIG. 1 there is shown an optical density versus wavelength in millimicrons plot of a preferred embodiment, filter A, and of single dye filters of the dyes comprised in filter A, i.e. filters 10–S, 11–S and 12–S. The optical densities were obtained by exposing the filters to a uniform amount of energy obtained from a General Electric No. 218 flashtube. These data were obtained by means of an electronic comparator and monochromator at manually selected wavelengths. The filters consisted of single or double quartz wedge assemblies as illustrated in FIGS. 3 and 4 below, which assemblies comprised one or more solution cells. The composition of the mixed dye solution for filter A is fully set forth in Example 1 below. Individual dye filter solutions 10–S, 11–S, and 12–S are made by dissolving 0.7% by weight of the solution of the respective dye compounds 10, 11, and 12 in a 10% by weight solution of polymethyl methacrylate (Acryloid B–72) in toluene. A polymeric solution is preferred since the use of a polymer leads to more uniform coloring of the dye and also tends to retard the thermal decay compared to that found in the pure solvent. It can be seen from FIG. 1 that the mixed dye solution of filter A exhibits average or intermediate properties of the separate dye filters with respect to absorption maximum and shape of the absorption curve, etc. Since the maximum sensitivity of the eye has been found to be around 550 millimicrons, it is advantageous to have a filter with peak absorption around this wavelength. It can also be seen from the absorption curve of filter A in FIG. 1 that the mixed dye solution filter provides, among other advantages, the stated advantage of peak absorption around 550 millimicrons.

FIG. 2 is a plot of optical density against decay time in seconds for mixed dye filter A and single dye filters 10–S, 11–S, and 12–S, all measurements taken at 25° C. The half-densities (D/2) of the above mentioned filters are seen to be, respectively, 5 seconds, 1 second, 13.5 seconds, and 1.5 seconds. Although, for certain uses, half-densities of around 30 seconds can be tolerated in favor of other filter improvements, the ideal half-density for many eye protective applications has been determined to be about 5 seconds. From the foregoing, it is obvious that only filter A, the mixed dye filter, exhibits a half-density of about 5 seconds.

Referring now to FIG. 3 there is illustrated a quartz wedge assembly consisting of two quartz wedges 30 arranged in a manner such that the diagonals face each other and are held in a spaced apart relation of about .020–.040 inch by Mylar spacers 32. The space between the diagonal faces forms a cell for holding the mixed dye photochromic solutions of the invention. The wedges are bonded to the Mylar strips with epoxy resin. The latter is also suitable for sealing the ends of the cells.

Referring now to FIG. 4, there is shown a filter assembly comprising a double quartz wedge assembly of the type shown in FIG. 3. In the embodiment of FIG. 4, the filter assembly consists of four quartz wedges 40 arranged as shown so as to provide three cells 41 for holding the mixed dye solution. In a manner similar to filters described in the above mentioned U.S. Pat. No. 3,152,215, the embodiment of FIG. 4 includes ultraviolet light transmitting filters 42, sideband filters 43, Mylar spacers 44, and UV flash tubes and reflectors 45. The chief distinction between the filter embodiments of Pat. No. 3,152,215 and those of the present invention resides in the use of a photochromic dye solution in the latter compared to photochromic dye containing polymeric coatings in the former. The means for obtaining and utilizing the advantages and capabilities of described filter embodiments, are more fully set forth in the before mentioned Pat. No. 3,152,215.

EXAMPLE I

A preferred embodiment of the mixed photochromic dye solution consists of 0.7% by weight of each of dyes 10, 11, and 12 dissolved in a solvent vehicle consisting of 10% by weight polymethyl methacrylate (Acryloid B–72) dissolved in toluene.

EXAMPLE II

In this example the composition consists of a toluene solution of 10% polymethylmethacrylate and 1.3% of dye (10) and 0.7% of dye (11).

EXAMPLE III

The composition of this example consists of a solution of 5% polystyrene and 1% compound (11) and 2.0% compound (12) in benzene.

EXAMPLE IV

This composition consists of 20% cellulose acetate butyrate, 1.5% dye compound (11), and 1.5% dye compound (13) dissolved in a solvent vehicle consisting of 50% toluene, 25% ethyl acetate, and 25% ethanol.

EXAMPLE V

This composition consists of 8% styrene methyl methacrylate copolymer, 1% dye (13), 1% dye (14), and 1% dye (15) dissolved in a solvent vehicle consisting of 60% benzene and 40% trichloroethylene.

EXAMPLE VI

The composition of this example consists of 12% polystyrene, 0.3% dye (10), 0.3% dye (12), and 0.4% dye (16) dissolved in a vehicle consisting of 50% toluene and 50% benzene.

EXAMPLE VII

This embodiment consists of 1% ethyl cellulose, 0.5% dye (10), 0.5% dye (12), 0.5% dye (17) dissolved in a solvent consisting of 75% toluene, 15% ethyl acetate, and 10% ethanol.

EXAMPLE VIII

This composition consists of 12% polymethyl methacrylate, 2% dye (18) and 2% dye (19) dissolved in toluene.

EXAMPLE IX

This composition consists of 10% polyvinyl acetate, 0.1% dye (10) and 0.2% dye (17) dissolved in a mixed solvent consisting of 50% toluene, 25% ethyl acetate, and 25% ethanol.

What is claimed is:

1. Color-reversible, liquid, mixed photochromic solution filter composition effective against high energy radiation consisting essentially of a major proportion of organic solvent and dissolved therein from 1 to 20 weight percent of thermoplastic polymer and from 0.2 to 4 weight percent of a photochromic mixture of: 1-methyl, 3-phenyl, 3-n-propyl, 6'-nitro indolino benzospiropyran and 1-isoamyl, 3,3 - dimethyl, 5,5',6' - trinitro, 8'-methoxy indolino benzospiropyran.

2. Color-reversible, liquid, mixed photochromic solution filter composition effective against high energy radiation consisting essentially of a major proportion of organic solvent and dissolved therein from 1 to 20 weight percent of thermoplastic polymer and from 0.2 to 4 weight percent of a photochromic mixture of: 1-isoamyl, 3,3-dimethyl, 5,5',5'trinitro, 8'-methoxy indolino benzospiropyran; 7-phenyl, 1,3,3-trimethyl, 5'-bromo, 6'-nitro, 8'-methoxy indolino benzospiropyran and 1,3,3-trimethyl, 6'-nitro indolino benzospiropyran.

3. Color-reversible, liquid, mixed photochromic solution filter composition effective against high energy radiation consisting essentially of a major proportion of organic solvent and dissolved therein from 1 to 20 weight weight percent of a photochromic mixture of: 1-phenyl, 3,3-dimethyl, 5'-bromo, 6'-nitro, 8'-methoxy indolino benzospiropyran; 1-phenyl, 3,3-dimethyl, 6'-nitro, 8'-methoxy indolino benzospiropyran; and 1-methyl, 3-phenyl, 3-n-propyl, 5',7'-dimethoxy, 6'-nitro indolino benzospiropyran.

4. Color-reversible, liquid, mixed photochromic solution filter composition effective against high energy radiation consisting essentially of a major proportion of organic solvent and dissolved therein from 1 to 20 weight percent of thermoplastic polymer and from 0.2 to 4 percent of a photochromic mixture of: 1-phenyl, 3,3-dimethyl, 5'-bromo, 6'-nitro, 8'-methoxy indolino benzospiropyran; 1-phenyl, 3,3-dimethyl, 6'-nitro, 8'-methoxy indolino benzospiropyran; and 1,3,3-trimethyl, 5',7'-dimethoxy, 6'-nitro indolino benzospiropyran.

5. Color-reversible, liquid, mixed photochromic solution filter composition effective against high energy radiation consisting essentially of a major proportion of organic solvent and dissolved therein from 1 to 20 weight percent of thermoplastic polymer and from 0.2 to 4 weight percent of a photochromic mixture of: 1,3 - dimethyl, 3-phenyl, 6'-nitro indolino benzospiropyran and 1,3,3-trimethyl, 5,5',6'-trinitro, 8'-methoxy indolino benzospiropyran.

6. Color-reversible, liquid, mixed photochromic solution filter composition effective against high energy radiation consisting essentially of a major proportion of organic solvent and dissolved therein from 1 to 20 weight percent of thermoplastic polymer and from 0.2 to 4 weight percent of a photochromic mixture of: 1-phenyl, 3,3-dimethyl, 5'-bromo, 6'-nitro, 8'-methoxy indolino benzospiropyran and 1,3,3-trimethyl, 5',7'-dimethoxy, 6'-nitro indolino benzospiropyran.

7. A color reversible, liquid, mixed photochromic, solution filter composition effective against high energy radiation and consisting essentially of a major proportion of toluene as a solvent, 8 to 12 percent by weight of the total composition of polymethyl methacrylate, and 0.7 percent by weight of the total composition of each of 1-phenyl, 3,3-dimethyl, 5'-bromo, 6'-nitro, 8'-methoxy indolino benzospiropyran; 1-methyl, 3-phenyl, 3-n-propyl, 6'-nitro indolino benzospiropyran and 1-phenyl, 3,3-dimethyl, 6'-nitro, 8'-methoxy indolino benzospiropyran.

References Cited

UNITED STATES PATENTS

| | | | |
|---|---|---|---|
| 3,085,469 | 4/1963 | Carlson | 355—37 |
| 3,100,778 | 8/1963 | Berman | 96—90 X |
| 3,231,584 | 1/1966 | Berman et al. | 252—300 X |
| 3,269,267 | 8/1966 | Collins | 350—1 |
| 3,290,331 | 12/1966 | Taylor et al. | 252—300 X |
| 3,359,103 | 12/1967 | Becker et al. | 96—90 X |

RICHARD D. LOVERING, Primary Examiner

U.S. Cl. X.R.

96—90; 350—160

UNITED STATES PATENT OFFICE
CERTIFICATE OF CORRECTION

Patent No. 3,528,926　　　　　　　　　Dated　September 15, 1970

Inventor(s) JOHN J. VAN VOORHIS ET AL.

It is certified that error appears in the above-identified patent and that said Letters Patent are hereby corrected as shown below:

Claim 3, line 4, after "weight" insert --percent of thermoplastic polymer and from 0.2 to 4--. Claim 4, line 6, before "percent" insert --weight--.

Signed and sealed this 6th day of April 1971.

(SEAL)
Attest:

EDWARD M. FLETCHER, JR.　　　　　WILLIAM E. SCHUYLER, JR.
Attesting Officer　　　　　　　　　Commissioner of Patents